FREQUENCY CONTROL FOR TELEGRAPH RECEIVERS

Filed Oct. 5, 1950

Inventors:
Dieter Leypold
Hans Rudolf &
Heinz Jürgens
By [signature]
Atty

Patented June 9, 1953

2,641,650

UNITED STATES PATENT OFFICE 2,641,650

FREQUENCY CONTROL FOR TELEGRAPH RECEIVERS

Dieter Leypold and Hans Rudolph, Munich, and Heinz Jürgens, Munich-Solln, Germany, assignors to Siemens & Halske, Aktiengesellschaft, Munich, Germany, a corporation of Germany Application October 5, 1950, Serial No. 188,628
In Germany May 13, 1949

7 Claims. (Cl. 178—69)

Figure 1:
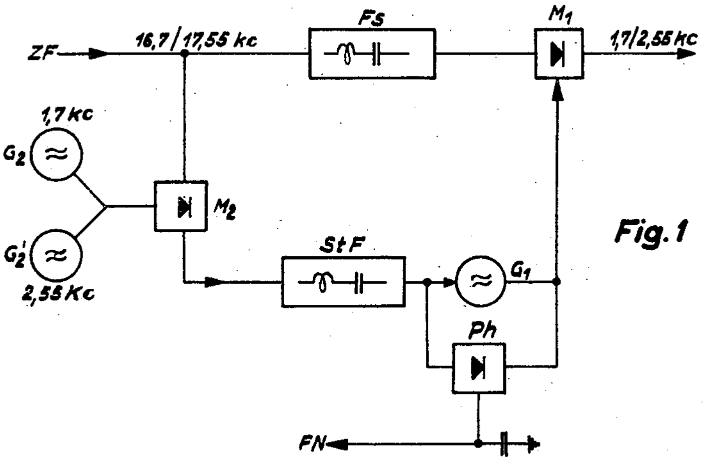

This invention is concerned with a circuit arrangement for adjusting the frequency in receivers coacting with frequency-keyed telegraph transmitters.

An adjustment is required, for example, in receivers which transform wireless messages transmitted in the form of two side bands and a carrier frequency into a low frequency range. The message after transformation into an intermediate frequency range is conducted to a single-band receiver and is there transformed into a low frequency range in one or more modulating stages. The carrier frequency, i. e., the control frequency which is likewise transformed, is then filtered out over a narrow control frequency filter to furnish a control voltage for the carrier frequency oscillator, or directly a carrier frequency for the successive modulation stage in which one of the side bands is transformed into the low frequency range.

A very narrow filter is required for separating the control frequency from the side bands. A frequency adjustment of the carrier frequency oscillator of a modulation stage preceding the control frequency filter is necessary in order to make sure that the control frequency agrees with the pass frequency of the filter. This adjustment must provide for the regulation of small, quick frequency variations and likewise for the regulation of slow and greater frequency variations.

The frequency adjustment utilizes the deviation of the control frequency from the desired frequency, e. g., of the median frequency of the control frequency filter, as a criterion for the adjustment of the carrier frequency oscillator of a modulation stage which precedes the control frequency filter. This may be accomplished, for example, by comparing in a suitable known phase bridge or the like the control frequency voltage at the input and at the output of the control frequency filter, or the input and output voltages of the oscillator, and employing the resulting voltage which is proportional to the phase difference for controlling the frequency adjustment.

It was customary until now, in receivers coacting with frequency-keyed telegraph transmitters, to use for the frequency adjustment one of the two signal frequencies. For example, a prolonged signal (spacing current) is transmitted during telegraph intervals and the frequency adjustment is tuned accordingly. In normal operation one must expect on the average 50% marking and 50% spacing current. There is therefore one-half of the time available for making the frequency adjustment operatively effective. However, during operation with strong interference one must take into account the most unfavorable signals and arrives thus at approximately one-fifth of the utilizable time for the frequency adjustment. The danger then appears that the receiver may get out of step.

This may happen, for example, upon exceeding the regulation range which may, however, be easily avoided by additional adjustment of the receiver motor. Of considerably greater importance is a wrong regulation caused by humming voltages. If a uniform humming or static spectrum is present at the input of the control frequency filter, an oscillation will occur at the filter output in which the median filter frequency predominates. In the case of frequency-keyed transmitters, the effective voltage is sometimes smaller than the humming voltage. A control voltage thus appears which attempts to detune the receiver. Since the humming always remains within the median filter frequency and therefore cannot be eliminated, there results a relatively great control voltage.

In order to avoid this drawback, the invention proposes to utilize for the frequency adjustment frequencies which correspond to the marking as well as to the spacing signals. These are transformed into the same frequency range by an auxiliary modulator and are conducted over a common narrow control frequency filter for the purpose of obtaining the carrier frequency or, rather to say, the input voltage for the control oscillator of the last or one of the last transforming stages, thereby obtaining over a suitable phase bridge or the like the adjustment voltage for the carrier frequency oscillator of a modulation stage which precedes the control frequency filter. The carrier voltages for the auxiliary modulator are preferably obtained from a two-frequency vibrator.

It must be considered, however, that the frequency variations are not the same in all frequency-keyed telegraph transmitters; they differ with different transmitters and may lie, for example, between 400 and 1200 cycles. The invention therefore proposes to make the carrier frequencies for the auxiliary modulator variable in opposite sense by identical frequency amounts. This may be accomplished, for example, by operating over a common drive in opposite senses the rotary condensers which are employed for the frequency variation in the frequency-determining oscillation circuits of two tube generators. A sufficiently accurate opposing operation of the frequency, however, requires different frequency variation characteristics of the rotary condensers.

The invention therefore proposes to obtain the carrier frequencies which are oppositely variable by identical amounts by multiplicative mixing of a variable frequency with at least one fixed frequency. For example, it is possible to mix multiplicatively one voltage of the median frequency with the voltage of a frequency which is variable within the range of one-half cycle, which may be done, e. g., by the use of a double opposition modulator. This mixing results in each case in the difference and in the sum of the frequencies which lie symmetrically to the median frequency and vary oppositely in the desired manner. Only the frequency of one generator need be varied in this case. However, the relatively great range of variation (1:3) at the lower frequencies between 200 and 600 cycles cannot be obtained by simple means; the indirect generation of the frequency by means of a level vibrator constitutes a considerable expenditure.

In accordance with the invention, one carrier frequency of the auxiliary modulator is therefore formed directly by a variable frequency and the other carrier frequency by the differential frequency which results in the multiplicative mixing of this variable frequency with the double median frequency.

It is also possible, in accordance with the invention, to mix multiplicatively with a variable frequency two fixed frequencies which lie symmetrical to the median frequency outside of the frequency variation range and to use as carrier frequencies the opposing side frequencies resulting therefrom.

Figure 2:
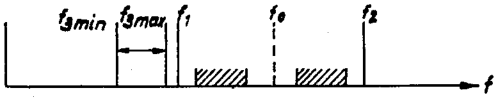
Figure 3:
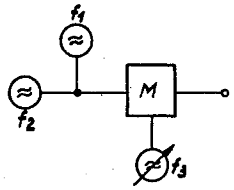
Figure 4:
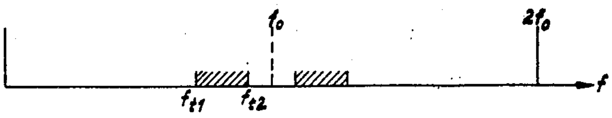
Figure 5:
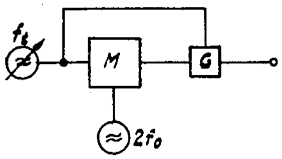
Figure 6:
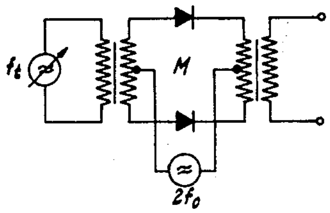

The various objects and features of the invention will now be described more in detail with reference to the accompanying drawings, wherein Fig. 1 is a diagram showing an embodiment of the invention;

Fig. 2 indicates the frequency shift signals resulting in the arrangement of Fig. 3 which shows a circuit for the production of the two oppositely varying carrier frequencies; and Figs. 4–6 illustrate various circuit schemes.

The figures show only the circuit elements required for an understanding of the invention. Known elements, and details which can be derived from the disclosure, have been omitted in order to avoid unnecessarily encumbering the drawings.

Referring now to Fig. 1, it is assumed that the frequencies coming from the intermediate frequency circuit branch ZF of the receiver and exhibiting frequency variations or displacements from 16.7 to 17.55 kc. are to be conducted over the filter Fs to the modulator $M_1$, where they are modulated with 15 kc. (generator $G_1$), resulting at the output in frequencies which exhibit variations from 1.7 to 2.55 kc. For the purpose of frequency adjustment, the incoming intermediate frequency is at the same time modulated with 1.7 kc. (generator $G_2$) and with 2.55 kc. (generator $G_{2'}$) in the auxiliary modulator $M_2$. There will therefore appear at the output of the modulator $M_2$, from the frequency 16.7 as well as from the frequency 17.55, the control frequency 15.0 kc., thus signifying that the spacing and the marker signals have been transformed into the identical frequency range of 15 kc. The control frequency is conducted over the narrow control frequency filter StF to produce the input voltage for the oscillator $G_1$ which feeds to the modulator stage $M_1$. The input voltage and the output voltage of the oscillator are compared by means of a known discriminator or phase bridge P*h*, and the resultant voltage which is proportional to the phase difference is utiilzed for the auxiliary frequency adjustment over the line FN. The frequency adjustment is thus continuously operative. The modulators $M_1$ and $M_2$ and the phase bridge P*h* may be made in accordance with well known practices. The line FN connects with an oscillator which coacts with a control frequency filter of a modulation stage which precedes the intermediate frequency circuit branch ZF. The corresponding oscillator and filter are known structures and therefore have been omitted from the drawing.

The arrangement yields a further advantage. The frequency variation amounts in the assumed example to 850 cycles. This value is not always accurately maintained by the transmitter. It may vary, e. g., by —50 cycles. If it is assumed that the variation is too high by 50 cycles, there will occur in the control frequency channel alternatively 15.00 and 15.05 kc. The oscillator $G_1$ is pulled off within a few cycles from 15.00 to 15.05 kc. and demodulates the intermediate frequency again exactly to 1.7/2.55 kc. The frequency adjustment (over the line FN) receives a regulating voltage which detunes the intermediate frequency so that the spacing and the marker currents are similarly varied, e. g., 16.725/17.525. The oscillator $G_1$ jumps from 14.975 to 15.025 kc. and a suitable instrument (not shown) which may be provided in the control voltage line FN swings about its zero position in step with the telegraph signals. A simple procedure may be used in order to indicate the error in the frequency variations at the transmitter. The oscillator $G_{2'}$ is in such a case disconnected, and the adjustment is carried out only with 1.7 kc. from the oscillator $G_2$ until a "0" adjustment error is indicated on a suitable instrument. $G_{2'}$ is then reconnected and $G_2$ is disconnected. The 2.55 kc. oscillator $G_{2'}$ is calibrated for detuning within about ±100 cycles and is varied until the detuning error is again 0. The amount of the detuning can now be directly read from the instrument. The frequencies utilized for the modulation are preferably chosen in a harmonic relationship, e. g., in a ratio of 2:3, because it is possible to recognize errors in the frequency variation purely audibly.

Fig. 3 shows the circuit scheme for producing the two oppositely variable carrier frequencies for the auxiliary modulator in the case of multiplicatively mixing two fixed frequencies $f_1$ and $f_2$ with a variable frequency $f_3$, e. g., by means of a double-step opposition modulator M. Fig. 2 indicates the correspondng frequency shift signals. It may be assumed in this case, for example, that the median frequency $f_0$ is 2125 cycles and that one of the two carrier frequencies varies from 1525 to 1925 cycles, while the other varies from 2325 to 2725 cycles. The frequency variation therefore should be adjustable between 400 and 1200 cycles. Now, if the fixed carrier frequencies $f_1$ and $f_2$ are, for example, 1417 and 2834 cycles, respectively, and if the frequency $f_3$ is chosen variable from 909 to 1309 cycles, the two carrier frequencies may be simply obtained within the chosen variation range by utilizing the resulting upper side frequency of the lower fixed frequency $f_1$ and the lower side frequency of the higher fixed frequency $f_2$. The pair of frequencies which are not used in any given case may be easily be suppressed by means of suitable filters. It is particularly advantageous to choose $f_2$ as a direct multiple of $f_1$, as has been assumed in the example noted. It is easily possible to generate the two frequencies without danger of mutual interference in a tube vibrator circuit with two back coupling paths or to obtain $f_2$ by a frequency multiplication from $f_1$, thereby avoiding the need for a special generator for $f_2$. The frequency $f_3$ of the variable generator requires, in the assumed example, variation merely in the ratio of 1:1.44.

Figs. 5 and 6 illustrate circuit arrangements for the case that one carrier frequency is formed directly by a variable frequency $f_t$, while the other is formed by the frequency difference produced in the modulator M by the mixing of this variable frequency with the double median frequency $2f_0$.

Fig. 4 shows the frequency shift signals corresponding to this arrangement. The lower carrier frequency is formed, e. g., directly by the frequency $f_t$ which varies from $f_{t1}$ to $f_{t2}$, while the higher carrier frequency is formed by the lower side frequency generated by the multiplicative mixing with $2f_0$. In order to avoid back-coupling to the modulator, a fork circuit G may be employed, as indicated in Fig. 5, or a simple modulator may be used for mixing $f_t$ and $2f_0$, as indicated in Fig. 6. In this case $f_t$ appears directly at the output terminals. Other modulation products which appear in each case may easily be suppressed by suitable filters.

Changes may be made within the scope and spirit of the appended claims.

We claim:

1. In a telegraph receiver circuit coacting with a frequency-keyed transmitter and having an incoming signal-receiving branch which modulates the incoming marker and spacing signal frequencies to form intermediate frequencies; a line for receiving said intermediate frequencies, a single auxiliary modulator connected with said line for directly receiving therefrom the intermediate frequencies corresponding to said marker and to said spacing signals, respectively, oscillator means coacting with said auxiliary modulator to produce a plurality of carrier frequencies therefor which cause said auxiliary modulator to place said marker and spacer intermediate frequencies in an identical frequency range, a control frequency filter connected with the output of said modulator for receiving the frequencies produced thereby, said control frequency filter being operative to filter out the two frequencies corresponding to said marker and spacing signals, respectively, and discriminating means connected with the output of said control frequency filter for adjusting the modulation of the incoming signal frequencies in said incoming signal-receiving circuit branch.

2. The circuit arrangement defined in claim 1, wherein said discriminating means comprises a control oscillator for receiving at its input side the filtered frequencies from said control frequency filter, a device for comparing the input and output voltages of said control oscillator, and line means connected with the output of said comparing device for receiving therefrom the resultant voltage which is proportional to the phase difference between the input and output voltages of said control oscillator for conducting such resultant voltage to said incoming signal-receiving circuit branch to adjust the modulation of the incoming signal frequencies therein.

3. The circuit arrangement defined in claim 1, wherein said discriminating means comprises a control oscillator for receiving at its input side the filtered frequencies from said control frequency filter, a device for comparing the input and output voltages of said control oscillator, line means connected with the output of said comparing device for receiving therefrom the resultant voltage which is proportional to the phase difference between the input and output voltages of said control oscillator for conducting such resultant voltage to said incoming signal-receiving circuit branch to adjust the modulation of the incoming signal frequencies therein, a filter connected to said line which receives the incoming intermediate frequencies, a second modulator connected with the output of such filter, and a line connecting said last-named second modulator with the output of said control oscillator.

4. The circuit arrangement defined in claim 1, wherein said oscillator means produces two carrier frequencies for controlling said single auxiliary modulator, said carrier frequencies being oppositely adjustable by identical frequency amounts.

5. The circuit arrangement defined in claim 1, wherein said oscillator means produces two carrier frequencies for controlling said single auxiliary modulator, said carrier frequencies being harmonically adjustable.

6. The circuit arrangement defined in claim 1, wherein said oscillator means comprises means for the multiplicative mixing of a variable frequency with at least one fixed frequency to produce two carrier frequencies for controlling said single auxiliary modulator, said carrier frequencies being oppositely variable by identical frequency amounts.

7. The circuit arrangement defined in claim 1, wherein said oscillator means comprises means for the multiplicative mixing of a variable frequency with two fixed frequencies which lie symmetrical to the median frequency to produce opposing frequencies for controlling said auxiliary modulator.

DIETER LEYPOLD.
HANS RUDOLPH.
HEINZ JÜRGENS.

References Cited in the file of this patent

UNITED STATES PATENTS

| Number | Name | Date |
|---|---|---|
| 2,211,750 | Humby | Aug. 20, 1940 |
| 2,232,390 | Katzin | Feb. 18, 1941 |
| 2,341,649 | Peterson | Feb. 15, 1944 |
| 2,356,390 | Finch | Aug. 22, 1944 |